United States Patent
Le Rouzic et al.

(10) Patent No.: US 10,182,037 B2
(45) Date of Patent: Jan. 15, 2019

(54) METHOD FOR THE TRANSMISSION OF A MESSAGE BY A SERVER OF AN IMS MULTIMEDIA IP CORE NETWORK, AND SERVER

(71) Applicant: Orange, Paris (FR)

(72) Inventors: Jean-Claude Le Rouzic, Trebeurden (FR); José Doree, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/411,018

(22) PCT Filed: Jun. 27, 2013

(86) PCT No.: PCT/FR2013/051504
§ 371 (c)(1),
(2) Date: Dec. 23, 2014

(87) PCT Pub. No.: WO2014/001724
PCT Pub. Date: Jan. 3, 2014

(65) Prior Publication Data
US 2015/0150115 A1    May 28, 2015

(30) Foreign Application Priority Data
Jun. 29, 2012 (FR) ...................... 12 56258

(51) Int. Cl.
*H04L 29/06* (2006.01)
*H04L 29/08* (2006.01)

(52) U.S. Cl.
CPC .......... *H04L 63/029* (2013.01); *H04L 65/105* (2013.01); *H04L 65/1006* (2013.01);
(Continued)

(58) Field of Classification Search
CPC . H04L 63/029; H04L 65/1016; H04L 65/105; H04L 65/1073; H04L 65/1006
See application file for complete search history.

(56) References Cited

U.S. PATENT DOCUMENTS

2004/0250107 A1* 12/2004 Guo ................. G06F 21/57
  726/23
2006/0117388 A1*  6/2006 Nelson ............. G06F 11/008
  726/25
(Continued)

FOREIGN PATENT DOCUMENTS

CN     101043744 A    9/2007
CN     101043744 B    6/2012

OTHER PUBLICATIONS

Jun et al. Jul. 11, 2005. Some comments and Proposal on IMS authentication bundled with NASS. Internet Citation: URL:http://portal.etsi.org/docbox/TISPAN/Open/Archives/Joint_meetings/2005-07_3GPP_TISPAN_Sophia_CT1-WG3/, retrieved on May 5, 2008, 3 pages.

(Continued)

*Primary Examiner* — Carl G Colin
*Assistant Examiner* — Vance M Little
(74) *Attorney, Agent, or Firm* — Knobbe, Martens, Olson & Bear, LLP

(57) ABSTRACT

A method for the transmission of a message by a server of a multimedia IP core network is disclosed. In one aspect, following the reception, by the server, of a request from a terminal to register with the core network, the registration request proposing an authentication method for the establishment of a secure tunnel between the terminal and an entity for the connection of the terminal to the core network. The transmission method may comprise identifying an access network used by the terminal for registering with the multimedia IP core network, drawing-up, according to the identified access network, a recommendation concerning the establishment or otherwise of the secure tunnel between the terminal and the connection entity for the authentication (Continued)

method, and inserting said recommendation into the message transmitted by the server.

24 Claims, 7 Drawing Sheets

(52) U.S. Cl.
CPC ...... *H04L 65/1016* (2013.01); *H04L 65/1073* (2013.01); *H04L 67/141* (2013.01)

(56) References Cited

U.S. PATENT DOCUMENTS

| | | | | |
|---|---|---|---|---|
| 2006/0135172 | A1* | 6/2006 | Dronne | H04L 47/10 |
| | | | | 455/452.2 |
| 2007/0169171 | A1* | 7/2007 | Kumar | H04L 63/08 |
| | | | | 726/2 |
| 2008/0095070 | A1* | 4/2008 | Chan | H04L 63/0272 |
| | | | | 370/254 |
| 2008/0201780 | A1* | 8/2008 | Khan | G06F 21/577 |
| | | | | 726/25 |
| 2008/0289027 | A1* | 11/2008 | Yariv | H04L 63/0227 |
| | | | | 726/11 |
| 2008/0305811 | A1* | 12/2008 | Cai | H04L 67/306 |
| | | | | 455/461 |
| 2009/0282236 | A1* | 11/2009 | Hallenstal | H04L 63/0428 |
| | | | | 713/151 |
| 2010/0162348 | A1* | 6/2010 | Narayanan | H04L 63/105 |
| | | | | 726/1 |

OTHER PUBLICATIONS

Koskinen et al. Sep. 5, 2005. IMS-NASS bundled authentication. Internet Citation. URL:ftp://ftp.3gpp.org/TSG_SA/WG3_Security/TSGS3_40_Slovenia/Docs/S3-050548.zip, retrieved on May 5, 2008, 6 pages.

ETSI (European Telecommunications Standards Institute). Jun. 21, 2005. TISPAN NGN Security Subpart 3—Security Architecture. ETSI Draft, 07012-3-NGN-R1V009, No. V0.0.9, pp. 1-72.

International Search Report dated Sep. 13, 2013, for International Application No. PCT/FR2013/051504 filed Jun. 27, 2013, 7 pages.

Written Opinion dated Sep. 13, 2013, for International Application No. PCT/FR2013/051504 filed Jun. 27, 2013, 6 pages.

3GPP TS 23.228 version 9.4.0 Release 9, Digital cellular telecommunications system (Phase 2+); Universal Mobile Telecommunications System (UMTS); LTE; IP Multimedia Subsystem (IMS), 255 pp., Oct. 2010.

3GPP TS 33.203 v11.1.0 (Mar. 2012), $3^{rd}$ Generation Partnership Project; Technical Specification Group Services and System Aspects; 3G security; Access security for IP-based services (Release 11), 114 pp., Mar. 2012.

Arkko et al., RFC 3329, Security Mechanism Agreement for the Session Initiation Protocol (SIP), The Internet Society, 24 pp., Jan. 2003.

Garcia-Martin et al., RFC 3455, Private Header (P-Header) Extensions to the Session Initiation Protocol (SIP) for the $3^{rd}$-Generation Partnership Project (3GPP), 34 pp., Jan. 2003.

Rosenberg et al., RFC 3261, SIP: Session Initiation Protocol, The Internet Society, 240 pp., Jun. 2002.

Section 5.1.1.2.2 Initial registration using IMS AKA, in 3GPP TS 24 229 v8.20.0 Release 8 (Jul. 2012), pp. 59-60, Jul. 2012.

Section 5.1.1.2.4 Initial registration using SIP digest with TLS, in 3GPP TS 24 229 v8.20.0 Release 8 (Jul. 2012), pp. 61, Jul. 2012.

\* cited by examiner

METHOD FOR THE TRANSMISSION OF A MESSAGE BY A SERVER OF AN IMS MULTIMEDIA IP CORE NETWORK, AND SERVER

RELATED APPLICATIONS

This application is the U.S. National Phase of Application No. PCT/FR2013/051504entitled "METHOD FOR THE TRANSMISSION OF A MESSAGE BY A SERVER OF AN IMS MULTIMEDIA IP CORE NETWORK, AND SERVER" filed Jun. 27, 2013 , which designated the United States, and which claims the benefit of French Application No. 1256258 filed Jun. 29, 2012.

BACKGROUND OF THE INVENTION

The invention relates to the general field of telecommunications, and more particularly to the field of multimedia IP (Internet Protocol) network architectures, such as, notably, network architectures using the technology known as "Voice over IP" (or VoIP).

It has a favored but non-limiting application in the context of multimedia IP core networks based on an IMS (IP Multimedia Subsystem) architecture, as proposed by the 3GPP (Third Generation Partnership Project) standard, and implementing the multimedia session initiation protocol SIP (Session Initiation Protocol). The SIP protocol, defined by the IETF (Internet Engineering Task Force) standard, is described in detail in the document RFC 3261 titled "SIP: Session Initiation Protocol", June 2002, published by the IETF.

The invention can, however, be used in association with other multimedia IP core network architectures, such as for example proprietary architectures, which may or may not implement the SIP protocol for the establishment of multimedia sessions (voice, text, video, data, etc.).

The invention more precisely relates to the security of communications between a terminal and a multimedia IP core network.

Telephone companies today have begun the migration of their circuit switching telephone networks to packet switching Voice over IP networks, such as for example VoIP networks based on an IMS architecture.

In these VoIP networks, a terminal may be connected and registered with the IMS core network by way of several access networks, such as, notably, via a 3GPP, xDSL (x Digital Subscriber Line), EPC (Evolved Packet Core), WLAN (Wireless Local Area Network), cable, WiMAX (Worldwide interoperability for Microwave Access) or CDMA2000 (Code Division Multiple Access 2000) access network.

The 3GPP standard, in its current definition, provides the possibility of establishing a secure link between a terminal and its server for connecting to the IMS core network, in other words between the terminal and the P-CSCF (Proxy-Call Session Control Function) server that is associated with it. This secure link, also known by the name of "secure tunnel" or "security association", results in the encryption (i.e. the enciphering) of the data conveyed between the terminal and the P-CSCF server, and the control of integrity of this data. As described in specifications RFC 3329 and TS 33.203 from the 3GPP, the parameters of this secure link (security protocol used, enciphering or signature algorithms, port numbers used, etc.) are exchanged between the terminal and the P-CSCF server when the terminal registers with the IMS core network. Once this secure link is established, a security association exists between the terminal and the P-CSCF server which guarantees that data transmitted or received by the terminal will not be spied on.

More precisely, when a terminal proposes a method of authentication comprising the establishment of a secure tunnel, it transmits a registration request comprising a "header" (field in the registration request) called "Authorization", as well as a "security-client" header containing:
  either the value "ipsec-3gpp", associated with the IPsec (Internet Protocol security) protocol (cf. Section 5.1.1.2.2 of the specification TS 24.229),
  or the value "tls", associated with the TLS (Transport Layer Security) protocol (cf. Section 5.1.1.2.4 of the specification TS 24.229),
which are the two secure tunnel mechanisms provided by the 3GPP (cf. Appendix H of the specification TS 33.203). The IPsec protocol is associated with the authentication method known as "IMS AKA", and the TLS protocol is associated with the authentication method known as "SIP digest with TLS".

However, the establishment and maintenance of such a secure tunnel is relatively expensive in resource terms, at terminal level and P-CSCF server level alike. Indeed, enciphering algorithms consume a good deal of CPU (Central Processing Unit) resources, which has an impact on the life of the batteries of the mobile terminals and requires the P-CSCF servers to be dimensioned in consequence.

The impact on the resources of the mobile terminals is further increased by the fact that the secure tunnel provided by the 3GPP standard is superimposed on the enciphering procedures already implemented by certain mobile access networks, such as the enciphering procedures provided for the protection of the information transmitted by the mobile terminals to SGSN (Serving GPRS Support Node) nodes for the control plane and BTS (Base Transceiver Station) or Node B nodes for the user plane of GERAN (GSM EDGE Radio Access Network) and UTRAN (UMTS Terrestrial Radio Access Network) networks, or to MME (Mobility Management Entity) entities for the control plane and e-NodeB entities for the user plane of LTE (Long Term Evolution) networks.

In other words, for these access networks, the data exchanged between the terminal and the multimedia IP core network are enciphered a first time by the enciphering procedures set up by the access networks, then the enciphered data obtained are enciphered a second time in the secure tunnel established between the terminal and the multimedia IP core network.

It should moreover be noted that one and the same terminal will be required to establish several communication channels on the user plane according to the services used (Internet, Voice over LTE, etc.), and for each of them a secure tunnel could be installed between the terminal and the access network.

If this multiple enciphering of data guarantees maximum protection of the data transmitted or received by the terminals, it also considerably reduces the autonomy of the terminals.

SUBJECT AND SUMMARY OF THE INVENTION

The invention notably makes it possible to remedy this drawback by proposing a method for the transmission of a message by a server of a multimedia IP core network following the reception by said server of a request from a terminal to register with the core network, said registration request proposing an authentication method providing for (or, equivalently, requiring) the establishment of a secure tunnel between the terminal and an entity for connecting this terminal to the core network, said transmission method comprising:

a step of identification of an access network used by the terminal for registering with the core network;

a step of drafting, according to the access network identified, of a recommendation regarding the establishment or non-establishment of the secure tunnel between the terminal and the connection entity for said authentication method; and a step of insertion of this recommendation into the message transmitted by the server.

Correlatively, the invention also pertains to a server of a multimedia IP core network, this server comprising means activated upon the reception, by the server, of a request from a terminal to register with the core network, said registration request proposing an authentication method providing for the establishment of a secure tunnel between the terminal and an entity for connecting this terminal to the core network, these means comprising:

means for identifying an access network used by the terminal for registering with the core network;

means for drafting, according to the access network identified, a recommendation regarding the establishment or non-establishment of the secure tunnel between the terminal and the connection entity for said authentication method;

means for inserting this recommendation into a message; and means for transmitting this message.

It will be noted that said authentication method proposed by the terminal may be indicated explicitly, but (as explained below) in the current state of the 3GPP standards it will preferably be indicated implicitly.

Thus, the invention proposes to condition the establishment of the secure tunnel between the terminal and the multimedia IP core network at least according to the access network used by the terminal for registering with the core network. For drafting this recommendation, the type of the access network used by the terminal (e.g. UMTS network, WiFi network, etc.) may notably be taken into account, but also other parameters linked to this access network such as, for example, the existence of secure roaming agreements with this access network, the fact that the access network used by the terminal for registering with the core network is a visited access network (international roaming situation) or else the fact that the access network used by the terminal is or is not located in the nominal network (home network) of the server establishing the recommendation, etc.

It should be noted that within the context of the invention an access network may comprise one or more access (sub) networks.

This conditioning is expressed, in accordance with the invention, in the form of a recommendation to establish or not establish the secure tunnel, said recommendation being transmitted by a server of the multimedia IP core network upon the registration of the terminal (i.e. in fine, when the establishment of the secure tunnel is required by the terminal).

The recommendation is drafted by the server, according to the access network identified, preferably taking into account a level of data security that the multimedia IP core network associates (or attributes) with (to) the access network used by the terminal.

This level of security can depend on several factors, such as for example the type of the access network (e.g. 3GPP access, WiFi (Wireless Fidelity) access, etc.), the existence of strong security procedures implemented on this network, the setup of secure roaming agreements with this access network by the core network, etc.). It reflects the trust that the multimedia IP core network (i.e. the operator of the multimedia IP core network) has in the security of the data exchanges provided by the access network. Thus, a multimedia IP core network can associate a low level of security with an access network in spite of the enciphering algorithms implemented by this access network, for example because this access network is associated with a sensitive geographical area, etc.

This recommendation thus allows the server to indicate a degree of necessity (or obligation) to establish the secure tunnel normally provided by the core network between the terminal and the connection entity, taking into account the security level guaranteed by the access network according to the multimedia IP core network.

It is of course intended to be transmitted to the terminal and/or to the connection entity in order to be executed upon the registration of the terminal.

The recommendation transmitted by the server preferably comprises one of the following instructions:

an instruction not to establish the secure tunnel between the terminal and the connection entity, for example because the IP core network considers that the access network used by the terminal comprises enciphering procedures that are sufficiently strong and reliable to guarantee the protection and the integrity of the data transmitted or received by the terminal;

an instruction of free choice regarding the establishment of the secure tunnel between the terminal and the connection entity;

an instruction to establish the secure tunnel between the terminal and the connection entity, for example because the access network used by the terminal is not considered as sufficiently secure in view of certain predetermined criteria (e.g. absence of data enciphering, absence of data integrity control, etc.).

Thus, for example, if the registration request from the terminal is received via a 3GPP access network (in other words via a secure radio access network by virtue of the definition of the 3GPP standard), which is moreover identified as being the nominal access network of the terminal or an access network with which a strong roaming agreement is concluded, the server can advise non-establishment of the secure tunnel between the terminal and the connection entity in its recommendation, or, in a variant, can leave the terminal free choice to establish or not establish this secure tunnel in this recommendation.

If, on the contrary, the terminal attempts to register via a fixed access network from a non-secure public WiFi hotspot, the server can then advise establishment of the secure tunnel between the terminal and the connection entity in its recommendation.

The recommendation of the server can be drafted by the server by comparing features and/or the type of access network used by the terminal with predetermined security criteria, in order to determine whether the security level provided by the access network is sufficient to relax the restriction on the establishment of the secure tunnel between the terminal and the connection entity.

In a favored and relatively simple variant embodiment, the recommendation of the server is drafted by consulting a previously established table or database, wherein a recommendation on the necessity (or the obligation) or otherwise to establish the security tunnel between the terminal and the connection entity is associated with various access networks.

This table may be filled by the operator of the multimedia IP core network according to the security level of the exchanges that it associates with the various access networks: this security level may be established by the operator of the core network, as mentioned previously, notably taking into account pre-existing knowledge of the security procedures (enciphering, integrity control, etc.) implemented on these various access networks (e.g. according to the type of access network and/or the operator of these networks, the definition of the standards observed by these access networks), the existence or otherwise of "strong" (reliable) roaming agreements with the access networks, or even the absence of sufficient information about an access network, etc.

The recommendation transmitted by the server of the multimedia IP core network thus offers the possibility of dispensing with the establishment of a secure link (tunnel) between the terminal and the connection entity when strong protection of the data and their integrity is already ensured by the access network used by the terminal.

In this way resources are saved both at terminal level (battery life is preserved) and at connection entity level.

In a variant, only two possible types of recommendation transmitted by the server are provided for, namely an instruction not to establish the secure tunnel or an instruction to establish the secure tunnel, so as to be more directional. This variant makes it possible to further save resources at the level of the terminal and the connection entity.

The invention therefore has a favored but non-limiting application when the multimedia IP core network implements an IMS architecture, wherein the establishment of a secure tunnel upon registration of a terminal is provided for in accordance with the 3GPP standard. In a more general way, it is applicable to any multimedia IP core network providing for the establishment of a secure tunnel between the terminal and the core network for access (when the terminal registers with the core network).

In an IMS framework, the server of the multimedia IP core network transmitting the recommendation can be an S-CSCF server, and the message into which the recommendation is inserted is then transmitted by the S-CSCF server toward the terminal via a P-CSCF server connecting the terminal to the multimedia IP core network.

It should be noted that the recommendation drafted by the S-CSCF server is preferably inserted into a response message intermediate to the registration request of the terminal such as a 401 Unauthorized SIP message, transmitted by the S-CSCF server to the terminal, in accordance with the SIP protocol.

The P-CSCF server can then propagate this recommendation to the terminal to prevent or, on the contrary, trigger the establishment of the secure tunnel between the terminal and the P-CSCF server.

One and the same S-CSCF server being able to be linked to several P-CSCF servers, this variant has the advantage of limiting the complexity related to the implementation of the invention and therefore of optimizing the exploitation of the core network (notably, a single pre-established table needs to be stored in memory in the S-CSCF server for transmitting recommendations relating to several connection entities).

Moreover, this variant offers the possibility of easily taking into account the information contained in the profile of the terminal user for drafting the recommendation (or weighting it). It is thus possible, for example, to envision associating with the profile of the terminal user an instruction according to which a secure tunnel must always be established for this user, independently of the security level associated with the access network used by the terminal for registering.

In a variant, the server of the multimedia IP core network transmitting the recommendation may be a P-CSCF server, and the message into which the recommendation is inserted is then transmitted to the terminal.

The recommendation drafted by the P-CSCF server is preferably inserted into a response message intermediate to the registration request from the terminal such as a 401 Unauthorized SIP message transmitted by the S-CSCF server to the terminal, which travels via the P-CSCF server, in accordance with the SIP protocol.

In other words, the server transmitting the recommendation may be the connection entity itself of the terminal in the multimedia IP core network. This variant makes it possible to have more local management of the establishment of the secure tunnel and to more easily take into account the local specifics of access to the core network (e.g. presence of certain access networks (e.g. WiFi) in a particular location).

In yet another variant, a recommendation is drafted in accordance with the invention both by an S-CSCF server and by a P-CSCF server of the multimedia IP core network. In this variant embodiment, if the recommendations respectively drafted by the S-CSCF server and by the P-CSCF server are different, only the recommendation transmitted by the P-CSCF server is taken into account and finally transmitted to the terminal. In other words, the recommendation transmitted by the P-CSCF server overwrites the recommendation transmitted by the S-CSCF server in the intermediate 401 Unauthorized SIP response message.

In a more general way, the server according to the invention may be incorporated into any entity of the core network that is able to receive registration requests from the terminals containing a request to establish a secure tunnel between the terminal and the entity for connecting this terminal to the core network.

In a particular embodiment of the invention, the recommendation is also drafted according to at least one parameter received with the registration request.

This parameter can be notably contained in the registration request or conveyed in the signaling associated with this registration request.

This embodiment makes it possible, for one and the same access network or for one and the same type of access network, to weight the conditioning according to the access network implemented by the server, via the parameter contained in the registration request.

This parameter can notably be a transport IP address of the registration request, i.e. the source address of the registration request from the terminal as received by the server. In a manner known to those skilled in the art, this source address can, according to the envisioned network configurations, correspond to the contact address or to the IP address of the terminal seeking to register (e.g. for a mobile access network) or to the IP address of an intermediate entity between the terminal and the server (e.g. a home gateway).

Thus, by way of example, for one and the same access network, it is advantageously possible to decide to transmit a strong recommendation not to establish a secure tunnel for a certain range of IP addresses whereas free choice will be allowed for another range of IP addresses or a selection of IP addresses.

In a variant, this parameter may be an identifier associated with the user of the terminal, such as an IMSI (International Mobile Subscriber Identity) identifier or an MSISDN (Mobile Station Integrated Services Digital Network) identifier.

In this way, for example, for one and the same access network, a decision may be made to transmit a general recommendation not to establish a secure tunnel, except for certain previously identified users (for example by inserting an appropriate indicator into the profiles of these users) for which a recommendation to establish a secure tunnel will on the contrary always be transmitted.

More generally, the taking into account of a parameter such as an identifier associated with the user of the terminal makes it possible to weight the drafted recommendation with respect to the access network used by the terminal, according to information associated with this identifier and present notably in the profile of the user. By way of example, this information includes the services to which the user has subscribed, his preferences, his belonging to a category of sensitive subscribers for which a secure link must always be implemented, etc.

In a particular embodiment of the invention, the transmitted message complies with the SIP protocol, and the recommendation of the server is inserted into a "Security Server" field of this message.

This embodiment makes it possible to interface easily with the existing SIP standard, conditional upon the addition of an appropriate parameter to the "Security Server" field defined by the 3GPP standard in Appendix H of the specification document TS 33.203, in order to inform the terminal or the connection entity that the implementation of a secure tunnel must (or can) take place or otherwise.

In a particular embodiment, the message transmitted by the server furthermore contains information allowing the establishment of the secure tunnel between the terminal and the connection entity.

This embodiment is compatible with terminals that are not capable of interpreting and/or executing the recommendation transmitted by the server. Whatever the opinion transmitted by the server and the security provided by the access network, such a terminal may thus establish a secure link on the basis of information contained in the message, so as to guarantee the protection and integrity of the data exchanged with the core network.

Moreover, this information may also be used when the recommendation transmitted by the server allows free choice regarding the establishment or non-establishment of the secure tunnel.

It should be noted that the effectiveness of the invention in reducing the complexity and the excessive expense in resource terms resulting from the existence of double enciphering of the data relies, on the one hand, on the server that transmits the recommendation regarding the establishment or non-establishment of the secure tunnel according to the access network used by the terminal, and, on the other hand, on the terminal itself, from the moment that the latter is able to execute the recommendation transmitted by the server when it registers with the core network.

Thus, according to another aspect, the invention also pertains to a method for registering a terminal with an IP core network, this method comprising:
- a step of transmission, by the terminal, of a request to register with the core network, via an access network, said registration request proposing an authentication method providing for the establishment of a secure tunnel between the terminal and an entity for connecting this terminal to the core network;
- a step of reception, by the terminal, from the core network, of a recommendation regarding the establishment or non-establishment of the secure tunnel between the terminal and the connection entity for said authentication method, this recommendation originating from a message transmitted by a server of the core network in accordance with a transmission method according to the invention, executed following the reception of the registration request from the terminal; and
- a step of interpretation of this recommendation by the terminal.

Correlatively, the invention also pertains to a terminal comprising:
- means for transmitting a request to register with a multimedia IP core network via an access network, said registration request proposing an authentication method providing for the establishment of a secure tunnel between the terminal and an entity for connecting this terminal to the core network;
- means for receiving, from the core network, a recommendation regarding the establishment or non-establishment of the secure tunnel between the terminal and the connection entity for said authentication method, this recommendation originating from a message transmitted by a server of the core network in accordance with the invention, following the reception of the registration request; and
- means for interpreting this recommendation.

The registration method and the terminal enjoy the same advantages as those mentioned previously for the method of transmission of a message and the server.

The invention also pertains to an entity for connecting a terminal to a multimedia IP core network, this connection entity comprising:
- means for receiving a request from the terminal to register with the core network, via an access network, said registration request proposing an authentication method providing for the establishment of a secure tunnel between said terminal and said connection entity;
- means for transmitting said registration request to a server in accordance with the invention;
- means for receiving, from the server, a message containing a recommendation regarding the establishment or non-establishment of the secure tunnel between the terminal and the connection entity for said authentication method; and
- means for transmitting this recommendation to the terminal.

Correlatively, the invention also pertains to a transmission method intended to be implemented by an entity for connecting a terminal to a multimedia IP core network, this transmission method comprising:
- a step of reception of a request from the terminal to register with the core network, via an access network, said registration request proposing an authentication method providing for the establishment of a secure tunnel between said terminal and said connection entity;
- a step of transmission of this registration request to a server of the core network;
- a step of reception, from the server, of a message containing a recommendation regarding the establishment or non-establishment of the secure tunnel between the terminal and the connection entity for said authentication method, the message resulting from the execution by the server of a method for transmitting a message in accordance with the invention; and a step of transmission of this recommendation to the terminal.

The connection entity thus relays the recommendation transmitted by the server of the multimedia IP core network to the terminal in order for the latter to apply this recommendation. It should be noted that no limitation is attached to the way in which the recommendation is transmitted, strictly speaking, to the terminal, i.e. the connection entity may in this case just include the recommendation in a message sent to the terminal (e.g. in a parameter of the Security Server field of a SIP message), or on the contrary modify the form, strictly speaking, of this recommendation, for example by not sending the information necessary for the establishment of the tunnel if the recommendation transmitted by the server is to not establish the tunnel between the terminal and the connection entity.

In a particular embodiment, the various steps of the method for transmitting a message and/or the registration method and/or the transmission method are determined by computer program instructions.

Consequently, the invention also pertains to a computer program on an information storage medium, this program being able to be implemented in a server or more generally in a computer, this program including instructions suitable for the implementation of the steps of a method for transmitting a message as described above.

The invention also pertains to a computer program on an information storage medium, this program being able to be implemented in a terminal or more generally in a computer, this program including instructions suitable for the implementation of the steps of a registration method as described above.

The invention also pertains to a computer program on an information storage medium, this program being able to be implemented in a connection entity or more generally in a computer, this program including instructions suitable for the implementation of the steps of a transmission method as described above.

These programs may use any programming language and be in the form of source code, object code, or intermediate code between source code and object code, such as in a partly compiled form, or in any other form desired.

The invention also pertains to a computer-readable information storage medium including instructions of a computer program as mentioned above.

The information storage medium can be any entity or device capable of storing the program. For example, the medium can include a storage means, such as a ROM, for example a CD-ROM or a microelectronic circuit ROM, or else a magnetic storage means, for example a diskette (floppy disk) or a hard disk.

Moreover, the information storage medium can be a transmissible medium such as an electrical or optical signal, which can be routed via an electrical or optical cable, by radio or by other means. The program according to the invention can in particular be downloaded over a network of Internet type.

Alternatively, the information storage medium can be an integrated circuit into which the program is incorporated, the circuit being suitable for executing or for being used in the execution of the method in question.

The invention also pertains to a communication system comprising:

a server of a multimedia IP core network in accordance with the invention;

a terminal according to the invention, capable of registering with the multimedia core network by sending a registration request to the core network via an access network, an entity for connecting the terminal to the multimedia IP core network; the terminal being capable of executing a recommendation drafted by the server regarding the establishment or non-establishment of a secure tunnel between the terminal and the entity for connecting the terminal to the core network.

Thus, the communication system according to the invention makes it possible to relax the restriction on the establishment of the secure tunnel between the terminal and the connection entity when a sufficient level of security of the exchanges is associated with the access network by the multimedia IP core network. In this way the resources of the terminal and the connection entity are saved.

It is also possible to envision, in other embodiments, that the method for transmitting a message, the registration method, the transmission method, the server, the terminal, the connection entity and the communication system according to the invention have all or some of the aforementioned features in combination.

BRIEF DESCRIPTION OF THE DRAWINGS

Other features and advantages of the present invention will emerge from the description given below, with reference to the drawings and appendices that illustrate exemplary embodiments thereof that are devoid of any limiting nature.

Figure 1:
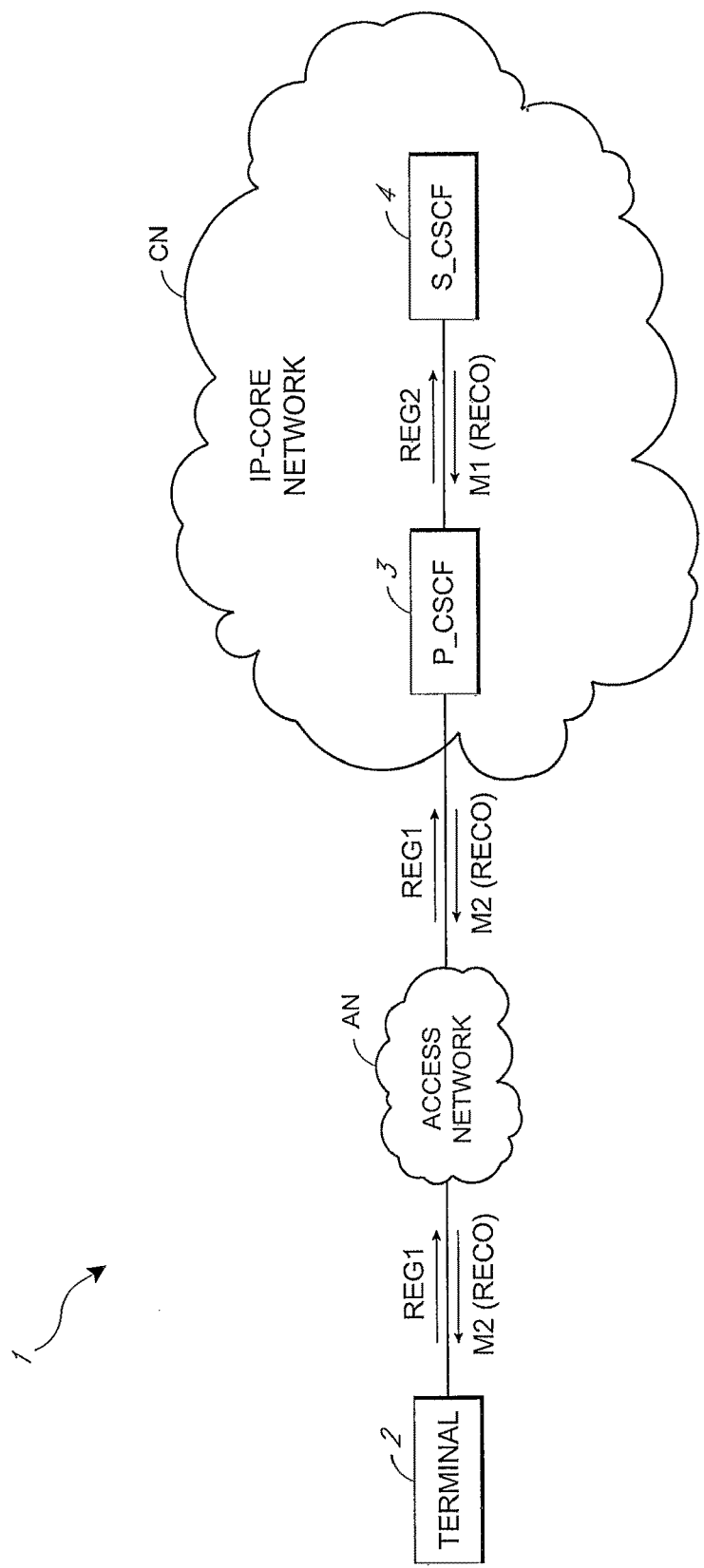
FIG. 1 schematically shows a communication system, a server, a connection entity and a terminal in accordance with the invention, in a first embodiment.
Figure 5:
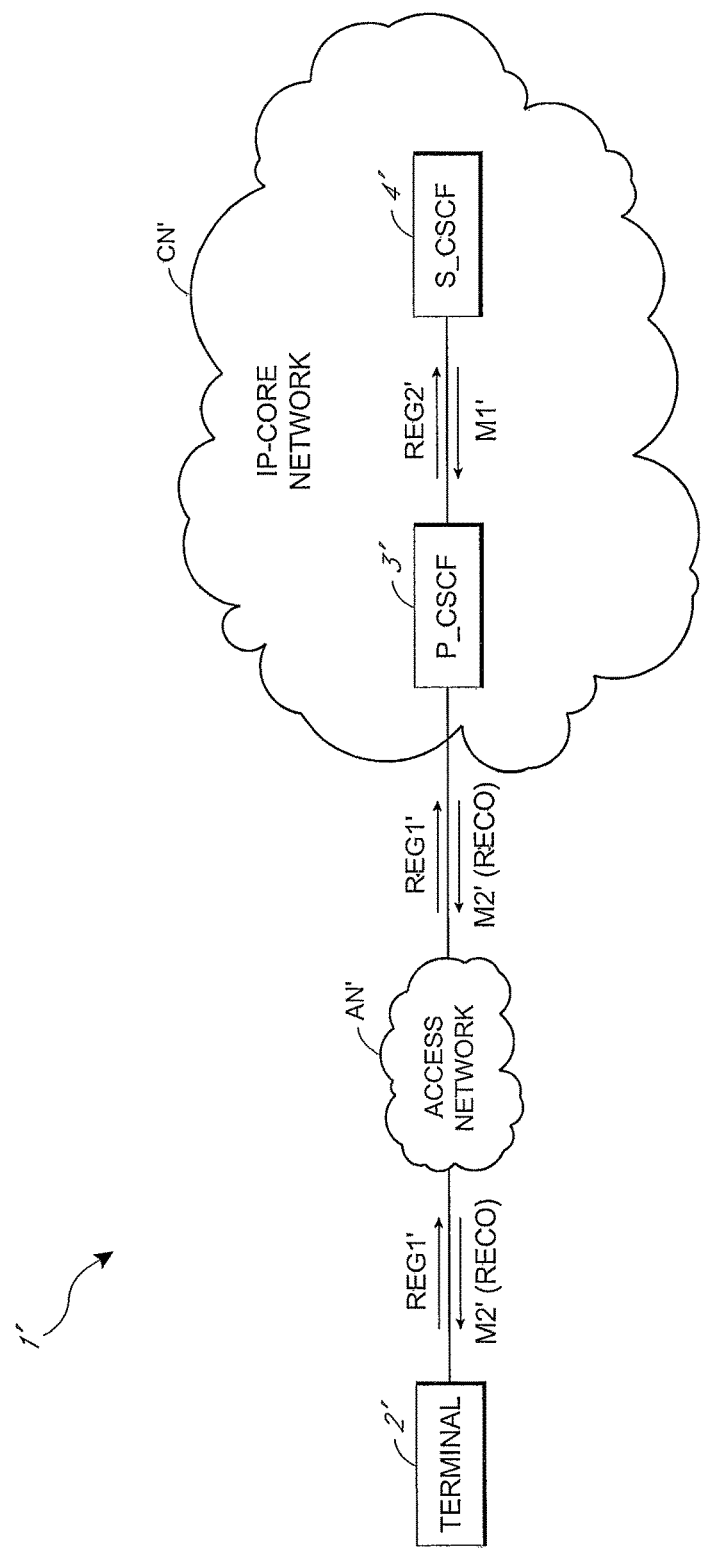
FIG. 5 schematically shows a communication system, a server and a terminal in accordance with the invention, in a second embodiment.

Appendix 1 gives examples of registration requests from the terminal in FIG. 1 and messages containing a recommendation transmitted by the server in FIG. 1, in the first embodiment; and Appendix 2 gives examples of a registration request from the terminal in FIG. 5 and a message containing a recommendation transmitted by the server in FIG. 5, in the second embodiment.

DETAILED DESCRIPTION OF THE INVENTION

FIG. 1 shows, in its environment, a communication system 1 in accordance with the invention, in a first embodiment.

The communication system 1 comprises a terminal 2 in accordance with the invention, capable of registering with a multimedia IP core network CN via an access network AN.

No limitation is attached in this case to the nature of the terminal 2. It can just as well be a mobile terminal, such as a smartphone, a portable computer, or a PDA (Personal Digital Assistant), as a fixed terminal.

Figure 2A:
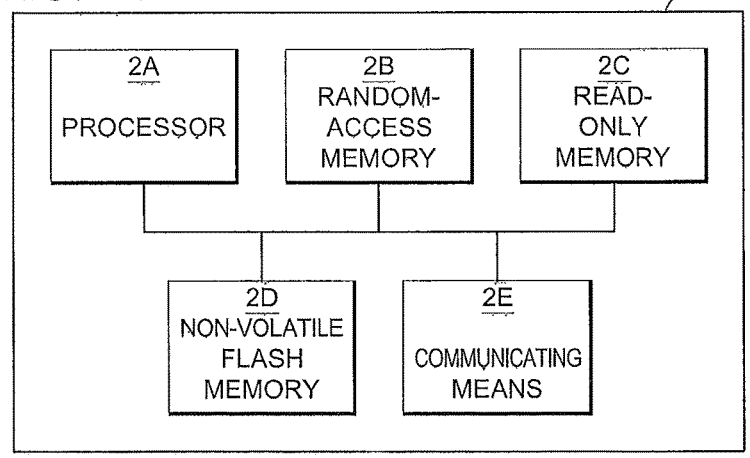
FIGS. 2A, 2B and 2C schematically show the respective hardware architectures of the terminal, the server and the connection entity in FIG. 1, in the first embodiment.

In the first embodiment described here, the terminal 2 possesses the hardware architecture of a computer, as schematically illustrated in FIG. 2A.

It includes a processor 2A, a random-access memory 2B, a read-only memory 2C, a non-volatile flash memory 2D and communicating means 2E notably implementing the SIP protocol and allowing it to communicate over the access network AN. The communicating means 2E allow the terminal 2 to communicate notably with the entities of the core network CN.

The read-only memory 2C of the terminal 2 constitutes a storage medium in accordance with the invention, which is readable by the processor 2A and on which a computer program in accordance with the invention is stored, including instructions for the execution of the steps of a method for registering with the core network CN in accordance with the invention, which are described below with reference to FIG. 3.

It should be noted that no limitation is attached to the access network AN used by the terminal 2 to connect to and register with the core network CN, from the moment that this access network is known to the core network CN. This access network may thus be, for example, a 3GPP access network, an xDSL access network, an EPC access network, etc. It can be managed by the same operator as the core network CN or by a separate operator.

The core network CN relies in this case on an IMS architecture, implementing the SIP protocol, as described in the specification document, TS23.228 of the 3GPP standard, titled "IP Multimedia Subsystem Stage 2", Release 9, September 2010, available on the site www.3gpp.org.

In a known manner, a core network implementing an IMS architecture comprises several functional entities, notably including a CSCF (Call Session Control Function) entity composed of several servers, among which:
 a S-CSCF (Serving-Call Session Control Function) server, handling in particular the registration of the terminals with the core network; and
 a P-CSCF (Proxy Call Session Control Function) server, playing the part of the entity for connecting the terminals to the core network.

Thus, in the example illustrated in FIG. 1, the core network CN comprises a P-CSCF server 3, entry point for the terminal 2 into the core network CN, and a S-CSCF server 4, handling of the registration of the terminal 2 with the core network CN. In accordance with the operation of the IMS core network CN, the requests to register with the core network CN that are transmitted by the terminal 2 travel via the P-CSCF server 3 before being routed to the S-CSCF server 4 for processing.

As mentioned previously, the 3GPP standard provides for (requires), according to the type of terminal and the type of SIM (Subscriber Identity Module) card with which the terminal is equipped (presence of a USIM (Universal Subscriber Identity Module) card or an ISIM (International Subscriber Identity Module) card), when a terminal registers with an IMS core network (and therefore with the core network CN), the establishment of a secure tunnel between the terminal and the entity for connecting this terminal to the core network, in other words between the terminal and the P-CSCF server associated with this terminal.

Secure tunnel established between two entities (e.g. a terminal and a P-CSCF server) is conventionally understood to mean a secure link established between the two entities ensuring, by means of adequate keys, the enciphering and/or the integrity of the data exchanged between these two entities.

The invention advantageously proposes, in order to preserve the resources of the terminal and the P-CSCF server, to condition the establishment of this secure tunnel at least according to the access network used by the terminal.

It should be noted that the invention is not limited to an architecture of IMS type. It can indeed be applied to other Multimedia IP core network architectures providing for the establishment of a secure tunnel during the registration of a terminal, such as, notably, proprietary architectures.

In the first embodiment described here, the conditioning of the establishment of the secure tunnel between the terminal 2 and the P-CSCF server 3 is performed via a recommendation drafted by the S-CSCF server 4. The S-CSCF server 4 of the core network CN thus incorporates on the one hand the functionalities of an S-CSCF server as defined by the 3GPP standard and on the other hand the features of a server of the communication system 1 in accordance with the invention.

Figure 2B:
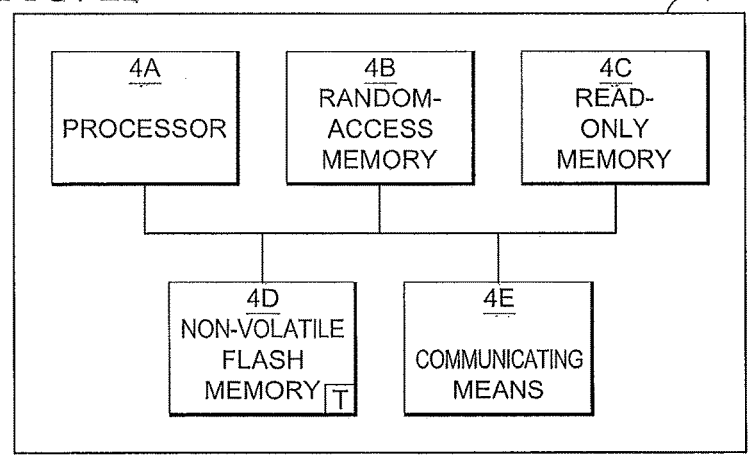

The S-CSCF server 4 in this case possesses the hardware architecture of a computer, as schematically illustrated in FIG. 2B.

It notably includes a processor 4A, a random-access memory 4B, a read-only memory 4C, a non-volatile flash memory 4D and communicating means 4E notably implementing the SIP protocol. These communicating means allow it to communicate with the entities of the core network CN and with the terminal 2.

The read-only memory 4C of the S-CSCF server 4 constitutes a storage medium in accordance with the invention, which is readable by the processor 4A and on which a computer program is stored in accordance with the invention, including instructions for the execution of the steps of a method for transmitting a message in accordance with the invention, which are described below with reference to FIG. 3.

Moreover, in the first embodiment, the recommendation drafted by the S-CSCF server 4 regarding the establishment or non-establishment of the secure tunnel between the terminal 2 and the P-CSCF server 3 is relayed by the P-CSCF server 3 to the terminal 2. Thus, the P-CSCF server 3 incorporates not only the functionalities of a P-CSCF server as defined by the 3GPP standard but also the features of a connection entity in accordance with the invention.

Figure 2C:
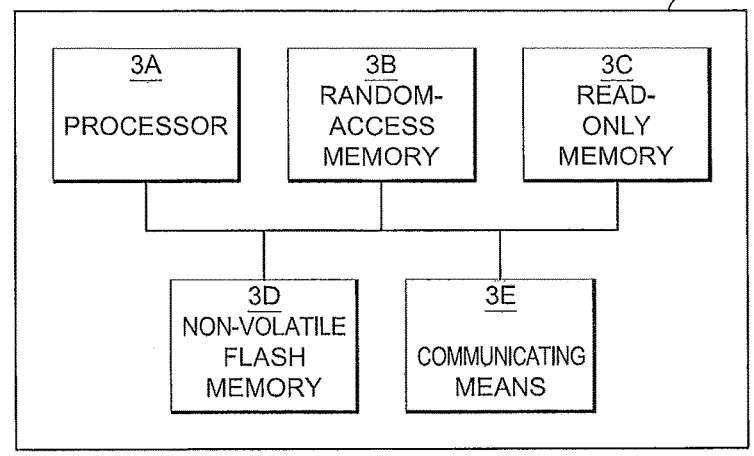

The P-CSCF server 3 in this case possesses the hardware architecture of a computer, as schematically illustrated in FIG. 2C.

It includes a processor 3A, a random-access memory 3B, a read-only memory 3C, a non-volatile flash memory 3D and communicating means 3E notably implementing the SIP protocol. These communicating means 3E allow it to communicate notably with the terminal 2 as well as with the other entities of the core network CN such as the S-CSCF server 4.

Figure 3:
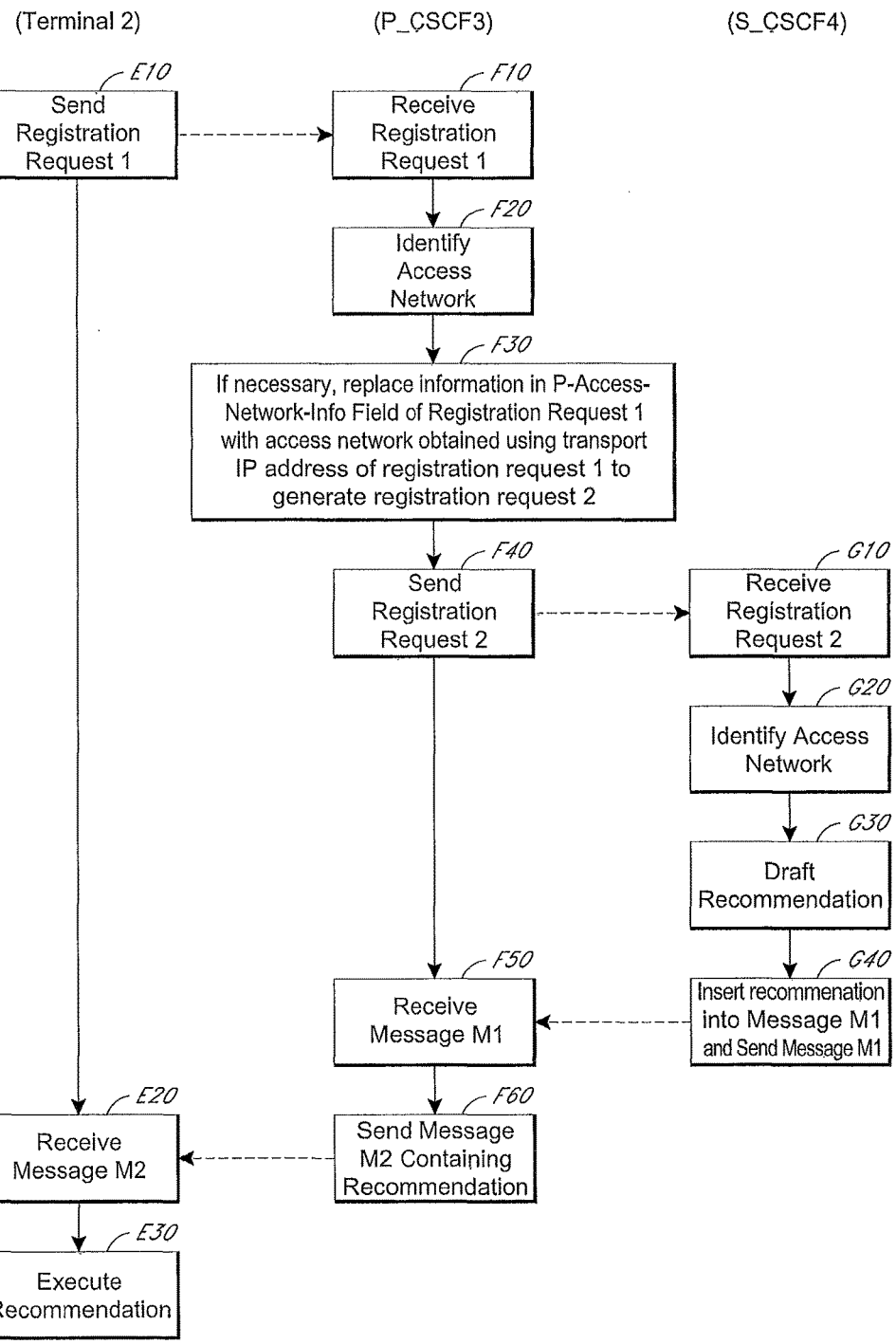
FIG. 3 shows, in the form of block diagrams, the main steps of a registration method, a transmission method and a method for transmitting a message as they are implemented by the terminal, the connection entity and the server, respectively, of FIG. 1 in the first embodiment.

The read-only memory 3C of the P-CSCF server 3 constitutes a storage medium in accordance with the invention, which is readable by the processor 3A and on which a computer program is stored in accordance with the invention, including instructions for the execution of the steps of a transmission method in accordance with the invention, which are described now with reference to FIG. 3.

We will now describe, with reference to FIG. 3, the main steps of a registration method, a transmission method and a method for transmitting a message implemented by the terminal 2, by the P-CSCF server 3 and by the S-CSCF server 4, respectively, in the first embodiment.

In the interests of simplicity, this first embodiment is limited to a recommendation drafted by the S-CSCF server 4 solely according to the access network used by the terminal 2 to register with the core network CN.

This hypothesis is non-limiting, however, and other parameters may be taken into account, in addition to the access network used by the terminal 2, to draft a recommendation. These parameters advantageously make it possible to weight the recommendation established according to the access network of the terminal 2, as mentioned further on in the description.

It is assumed that the terminal 2 wishes to register with the core network CN, via the access network AN, for example to access multimedia services managed by the core network CN.

For this purpose, the terminal 2 transmits, via its communicating means 2E, a registration request REG1 to the core network CN (step E10). In the first embodiment described here, this registration request REG1 is a REGISTER SIP request.

An example of such a request is given in Appendix 1 (cf. example Ex. 1). In a known manner it notably comprises an identifier of the user of the terminal 2 in the fields "From" and "To", as well as an item of information relating to the access network AN used by the terminal 2 for registering with the core network CN. This item of information is found in the field, "P-Access-Network-Info" of the request REG. Thus, in the example of Appendix 1, AN is an access network of 3GPP-UTRAN-TDD type.

The request REG1 transmitted by the terminal 2 also contains information relating to the establishment of a secure tunnel with the P-CSCF server 3 of the core network CN, in accordance with the 3GPP standard. This information is contained in the "Security-Client" field of the registration request. Thus, the secure tunnel proposed by the terminal will be of IPsec type for an IMS AKA authentication, and of TLS type for an SIP digest with TLS authentication. For example, in the example Ex. 1 of Appendix 1, the item of information "ipsec-3gpp" indicates that the protocol IPsec is involved. Said information may also comprise the enciphering and integrity control algorithms envisioned (in the example Ex. 1, these are the known algorithms "hmac-sha1-96" and "des-ede3-cbc"), the ports on which the tunnel needs to be set up, etc.

The registration request REG1 is received by the P-CSCF server 3 connecting the terminal 2 to the core network CN (step F10).

On receiving this request, the P-CSCF server 3 identifies which access network AN is used by the terminal 2 for registering with the core network CN (step F20).

It should be noted that the information about the access network, which is included by the terminal 2 in its registration request REG1, is not necessarily reliable, so that the P-CSCF server 3 uses its own means in this case to determine which access network AN the terminal 2 uses.

For this purpose it uses techniques known to those skilled in the art.

One of these techniques consists in establishing, in a preliminary phase, and in keeping updated, in the P-CSCF server 3, a correspondence table wherein an access network is associated with a range of IP addresses. These IP addresses correspond to transport IP addresses that are able to be used to transport the requests of the terminals seeking to connect to the core network CN (and therefore to register with the core network CN). According to the network configurations envisioned, these may be IP addresses or contact addresses of the terminals seeking to connect, or IP addresses of intermediate entities between these terminals and the P-CSCF server 3.

Such a table can be easily established by the operator of the core network CN, for each access network known to the operator (upon each new installation of an access network, for example).

Thus, in the first embodiment described here, the P-CSCF server 3 first determines, using means known to those skilled in the art, the transport IP address of the registration request REG1 that it has received (i.e. the source IP address of the request REG1 as received by the P-CSCF server 3).

It then compares this transport IP address with the IP address ranges filling the correspondence table. It thereby deduces the access network AN used by the terminal 2 for registering (step F20).

If necessary, the P-CSCF server 3 replaces the information contained in the "P-Access-Network-Info" field of the registration request REG1 with the network AN obtained using the transport IP address of the request REG1 (step F30). The information contained in the P-Access-Network-Info field following this modification is an item of network information certified by the P-CSCF server 3.

The P-CSCF server 3 also modifies certain fields of the request, in a manner known per se, in accordance with the 3GPP standard. Thus, for example, it removes the "Security-Client" field from the request.

The registration request from the terminal as modified by the P-CSCF server 3 is then transmitted using the communicating means 3E thereof to the S-CSCF server 4, in the form of a request REG2 (step F40). The request REG2 is, in spite of the modifications made to the request REG1 received from the terminal 2, a registration request from the terminal 2 within the context of the invention.

In Appendix 1, an example of a request REG2 derived from the request REG1 given in the example Ex. 1 is supplied in the example Ex. 2.

On receiving the registration request REG2 from the terminal 2 (step G10), the S-CSCF server 4 identifies the access network AN used by the terminal 2 to register by consulting the "P-Access-Network-Info" field of the request, as set by the P-CSCF server 3 (step G20).

It then drafts, according to the access network thus identified, a recommendation RECO regarding the establishment or non-establishment of the secure tunnel between the terminal 2 and the P-CSCF server 3 (step G30). This recommendation expresses the convenient (i.e. useful or obligatory) nature of the establishment of the secure tunnel between the terminal 2 and the P-CSCF server 3 so as to guarantee the protection and integrity of the data exchanged between the terminal 2 and the core network CN.

This recommendation is drafted in this case by taking into account a data security level that the multimedia IP core network associates with the access network used by the terminal.

For this purpose, in the first embodiment described here, the S-CSCF server 4 uses a previously established table (or database) wherein a recommendation on the necessity or otherwise of establishing the security tunnel between the terminal and the connection entity is associated with various access networks. The table T is stored in the non-volatile memory 4D of the S-CSCF server 4, for example.

This table T is filled in this case by the operator of the core network CN, according to the security level of the exchanges (e.g. inadequate or weak versus adequate or strong) that it associates with the various access networks. Thus, if the security level of an access network is considered strong, a recommendation not to establish a secure tunnel is associated with this access network in the table T. Conversely, if the security level of an access network is considered weak, a recommendation to establish the secure tunnel is associated with this access network in the table T.

The security level of an access network may be established by the operator by notably taking into account pre-existing knowledge of the security procedures (enciphering, integrity control, etc.) implemented on these various access networks (e.g. according to the type of access network and/or the operator of these networks, the definition of the standards observed by these access networks), the existence or otherwise of "strong" (reliable) roaming agreements with the access networks, or even the absence of sufficient information about the security procedures implemented by an access network, etc.

Figure 4:
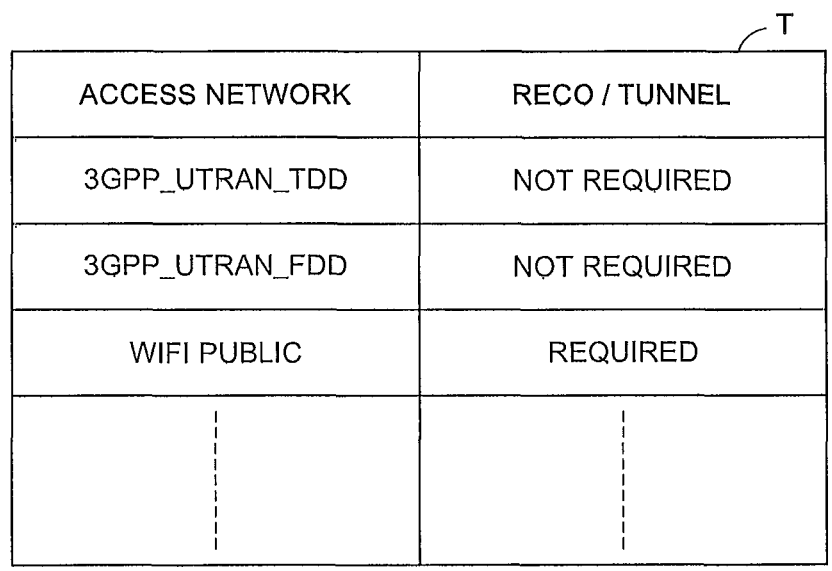
FIG. 4 illustrates a table associating a recommendation regarding the establishment of a secure link with various access networks, and used by the server in FIG. 1 for drafting its recommendation in the first embodiment.

One example of such a table T is illustrated in FIG. 4. In this example, a recommendation not to establish a secure tunnel between the terminal 2 and the P-CSCF server 3 ("Not required" recommendation) is associated with a 3GPP-UTRAN-TDD access network and a 3GPP-UTRAN-FDD access network, whereas a recommendation to establish the secure tunnel ("Required" recommendation) is associated with a Public WiFi access network. In other words, in this table a strong security level is implicitly associated with the 3GPP-UTRAN-TDD and 3GPP-UTRAN-FDD access networks, and a weak security level is implicitly associated with the Public WiFi access network.

In a variant, another type of recommendation may be envisioned, leaving free choice for the terminal 2 and/or the P-CSCF server 3 to establish or not establish the secure tunnel advised by the 3GPP standard.

In the example illustrated in Appendix 1, the access network AN used by the terminal 2 is an access network of 3GPP-UTRAN-TDD type. It is associated with a recommendation RECO not to establish the secure tunnel between the terminal 2 and the P-CSCF server 3.

The S-CSCF server 4 inserts the recommendation RECO obtained by consulting the table T from the access network AN into a message M1 intended for the terminal 2 (step G40). In the example described here, the message M1 is a 401 Unauthorized SIP response message intermediate to the registration request from the terminal 2, which travels via the P-CSCF server 3, in accordance with the SIP protocol.

An example of such a message M1 containing the recommendation RECO of the S-CSCF server 4 is given in Appendix 1 (cf. example Ex. 3). The recommendation is inserted in this example into the "Security-Server" header (field) (cf. Appendix H of the specification TS 33.203) of the M1 SIP message, using a "tunnel" parameter set to the "not_required" value.

Of course, other ways of inserting this recommendation into the M1 SIP message may be envisioned in a variant, such as for example in another field of the M1 SIP message (such as a field newly created for the purposes of the invention) or in another parameter.

The P-CSCF server 3 receives the message M1 containing the recommendation RECO from the S-CSCF server 4 regarding the establishment of the secure tunnel with the terminal 2 (step F50).

It transmits (i.e. propagates) this recommendation RECO to the terminal 2 in a message M2 derived from the message M1 received from the S-CSCF server 4 (step F60). The message M2 is therefore also a 401 Unauthorized SIP message.

In the first embodiment described here, the message M2 furthermore contains information enabling the establishment of the secure tunnel between the terminal 2 and the P-CSCF server 3, independently of the content of the recommendation RECO. In this way, the P-CSCF server 3 ensures that if the terminal 2 is not capable of executing the recommendation RECO, the tunnel will be established in accordance with this information, and the protection of the data exchanged between the terminal 2 and the core network CN will thus be ensured.

An example of a message M2 containing the recommendation RECO of the S-CSCF server 4 is given in Appendix 1 (cf. example Ex. 4). In this example the recommendation is inserted into the "Security-Server" field of the SIP message M2, in the form "tunnel=not_required", with the information enabling the establishment of the secure tunnel ("ipsec-3gpp", "alg=hmac-sha1-96", etc.).

On receiving the message M2 (step E20), the terminal 2 interprets and executes the recommendation RECO contained in the message M2 (step E30): in other words, in this case, it does not establish a tunnel with the P-CSCF server 3.

The recommendation drafted by the S-CSCF server 4 therefore makes it possible to block the establishment of the tunnel initially provided by the core network CN, and thus to preserve the resources of the terminal 2 and the P-CSCF server 3.

The registration of the terminal 2 with the core network CN then continues in a manner known per se.

In the first embodiment, the recommendation to establish or not establish the secure tunnel between the terminal 2 and its entity for connecting to the core network CN (i.e. the P-CSCF server 3) is drafted by the S-CSCF server 4.

A second embodiment will now be described, with reference to FIGS. 5 to 7 and to Appendix 2, wherein this recommendation is drafted by the entity itself for connecting the terminal to the core network, in other words, in an architecture of IMS type, by the P-CSCF server associated with the terminal.

FIG. 5 shows, in its environment, a communication system 1' in accordance with the invention, in this second embodiment.

The communication system 1' comprises a terminal 2' in accordance with the invention, capable of registering with a multimedia IP core network CN' via an access network AN'.

As previously for the first embodiment, no limitation is attached to the nature of the terminal 2' or to the access network AN' used by the terminal 2' for registering with and connecting to the core network CN'.

The terminal 2' possesses a hardware architecture identical to that of the terminal 2, illustrated in FIG. 2A described previously. Its read-only memory constitutes a storage medium in accordance with the invention, which is readable by the processor of the terminal 2' and on which a computer program is stored in accordance with the invention, including instructions for the execution of the steps of a method for registering with the core network CN' in accordance with the invention, which are described below with reference to FIG. 7.

The core network CN' relies in this case on an IMS architecture and comprises a P-CSCF server 3', the entry point for the terminal 2' into the core network CN', and an S-CSCF server 4', handling the registration of the terminal 2' with the core network CN'. As described previously for the core network CN and in accordance with the 3GPP standard, the core network CN' requires the establishment of a secure tunnel between the terminal 2' and the entity for connecting this terminal to the core network, in other words between the terminal 2' and the P-CSCF server 3' associated with this terminal.

Figure 6:
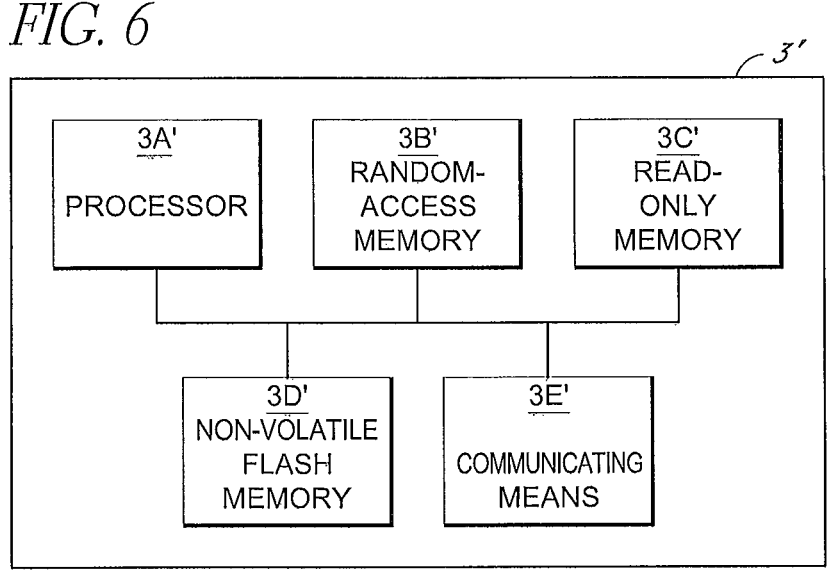
FIG. 6 schematically shows the hardware architecture of the server in FIG. 5.

The P-CSCF server 3' in this case possesses the hardware architecture of a computer, as schematically illustrated in FIG. 6.

It notably includes a processor 3A', a random-access memory 3B', a read-only memory 3C', a non-volatile flash memory 3D' and communicating means 3E' notably implementing the SIP protocol. These communicating means allow it to communicate with the entities of the core network CN' and with the terminal 2'.

Figure 7:
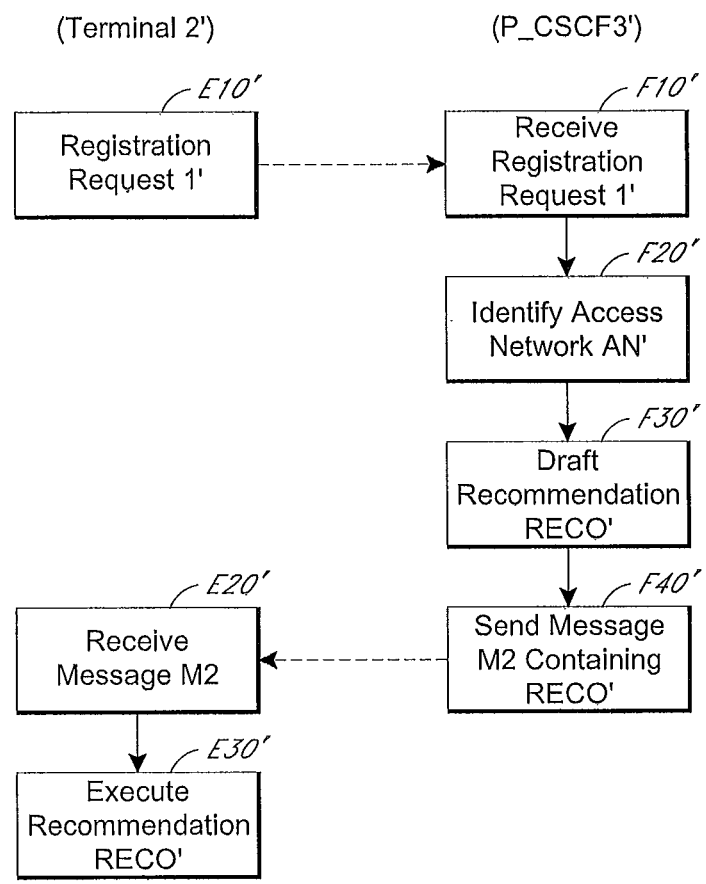
FIG. 7 shows, in the form of block diagrams, the main steps of a registration method and a method for transmitting a message as they are implemented by the terminal and the server, respectively, in FIG. 5 in the second embodiment.

The read-only memory 3C' of the P-CSCF server 3' constitutes a storage medium in accordance with the invention, which is readable by the processor 3A' and on which a computer program is stored in accordance with the invention, including instructions for the execution of the steps of a method for transmitting a message in accordance with the invention, which are described now with reference to FIG. 7.

FIG. 7 illustrates the main steps of a registration method and a method for transmitting a message that are implemented by the terminal 2' and by the P-CSCF server 3', respectively, in the second embodiment.

It should be noted that the steps implemented by the terminal 2' and represented in FIG. 7 are identical to the steps implemented by the terminal 2 and represented in FIG. 3 for the first embodiment. They will therefore not be described in detail here.

Moreover, in the interests of simplicity, this second embodiment is limited to a recommendation drafted by the P-CSCF server 3' solely according to the access network used by the terminal 2' to register with the core network CN'. This hypothesis is non-limiting, however, and other parameters may be taken into account, in addition to the access network used by the terminal 2', to draft a recommendation, as mentioned in the description below.

It is assumed that the terminal 2' wishes to register with the core network CN', via the access network AN', for example to access multimedia services managed by the core network CN'.

For this purpose, the terminal 2' transmits, via its communicating means 2E', a registration request REG1' intended for the core network CN' (step E10'). This registration request REG1' is a REGISTER SIP request.

An example of such a request is given in Appendix 2 (cf. example Ex. 1). It notably comprises an identifier of the user of the terminal 2' in the "From" and "To" fields, as well as an item of information relating to the access network AN' used by the terminal 2' for registering with the core network CN'. This item of information is found in the "P-Access-Network-Info" field of the request REG1'. Thus, in the example Ex. 1 of Appendix 2, AN' is an access network of 3GPP-UTRAN-TDD type.

The request REG1' transmitted by the terminal 2' also contains information relating to the establishment of a secure tunnel with the P-CSCF server 3' of the core network CN', in accordance with the 3GPP standard, in the "Security-Client" field of the registration request. Thus, the secure tunnel proposed by the terminal will be of IPsec type for an IMS AKA authentication, and of TLS type for a SIP digest with TLS authentication. For example, in the example Ex. 1 of Appendix 2, the item of information "ipsec-3gpp" indicates that the protocol IPsec is involved. Said information may also comprise the enciphering and integrity control algorithms envisioned (in the example Ex. 1, these are known algorithms "hmac-sha1-96" and "des-ede3-cbc"), the ports on which the tunnel needs to be set up, etc.

The registration request REG1' is received by the P-CSCF server 3' connecting the terminal 2' to the core network CN' (step F10').

On receiving this request, the P-CSCF server 3' identifies which access network AN' is used by the terminal 2' to register with the core network CN' (step F20'). For this purpose, it proceeds in an identical manner to the P-CSCF server 3 in step F20 of the first embodiment, by using the transport IP address of the request REG1' that it has received.

If necessary it replaces the information contained in the "P-Access-Network-Info" field of the received registration request REG1' with a certified item of information obtained on the basis of the identification of the network AN' deduced from the transport IP address of the request REG1', then transmits the registration request thus modified, in the form of a request REG2', to the S-CSCF server 4' for processing.

The P-CSCF server 3' then drafts, according to the identified access network AN', a recommendation RECO' regarding the establishment or non-establishment of the secure tunnel with the terminal 2' (step F30'). As described previously, this recommendation expresses the convenient (i.e. useful or obligatory) nature of the establishment of the secure tunnel between the terminal 2' and the P-CSCF server 3' so as to guarantee the protection and integrity of the data exchanged between the terminal 2' and the core network CN'.

This recommendation is drafted in an identical manner to the recommendation RECO drafted by the S-CSCF server 4 in the first embodiment (cf. step G30 described previously), using table T, which is, in the second embodiment, stored in the non-volatile memory 3D' of the P-CSCF server 3'.

In the example illustrated in Appendix 2, the access network AN' used by the terminal 2' is a 3GPP-UTRAN-TDD access network. It is associated, in the table T, with a recommendation not to establish the secure tunnel between the terminal 2' and the P-CSCF server 3'.

The P-CSCF server 3' inserts the recommendation RECO' obtained by consulting the table T from the access network AN' into a message M2' that it then sends to the terminal 2' (step F40'). This message M2' into which the P-CSCF server 3' inserts the recommendation RECO' is derived from the intermediate 401 Unauthorized SIP response message M1' sent by the S-CSCF server 4' to the terminal 2' in response to the registration request REG2' from the terminal 2', which travels, in accordance with the SIP protocol, via the P-CSCF server 3'.

One example of such a message M2' containing the recommendation RECO' of the P-CSCF server 3' is given in Appendix 2 (cf. example Ex. 2). The recommendation is inserted, in this example, into a "Security-Server" field of the SIP message M2', in a "tunnel" parameter set to the "not_required" value.

In the second embodiment described here, the message M2' furthermore contains information allowing the establishment of the secure tunnel between the terminal 2' and the P-CSCF server 3', independently of the content of the recommendation RECO'. In this way, the P-CSCF server 3' ensures that if the terminal 2' is not capable of executing the recommendation RECO', the tunnel will be established in accordance with this information, and the protection of the data exchanged between the terminal 2' and the core network CN' will thus be ensured.

On receiving the message M2' (step E20'), the terminal 2' interprets and executes the recommendation RECO' contained in the message M2' (step E30'): in other words, in the example under consideration, it does not establish a tunnel with the P-CSCF server 3'. The registration of the terminal 2' with the core network CN' continues in a manner known per se.

In the two embodiments described here, the S-CSCF 4 and P-CSCF 3' servers draft their recommendation using a pre-established table T associating a recommendation regarding the establishment or non-establishment of a secure tunnel between the terminal and the P-CSCF server connecting the terminal to the core network with various access networks. As mentioned previously, this table T implicitly takes into account the security levels that the core network associates with the various access networks.

In a variant, other ways of taking into account the access networks and their security levels to draft the recommendation may be envisioned.

Thus, for example, the recommendation may be drafted on receiving the registration request from the terminal by dynamically comparing features and/or the type of the access network used by the terminal with predetermined security criteria, first in order to associate a data security level with the access network, then to determine if the security level ensured by the access network is sufficient to relax the restriction on the establishment of the secure tunnel between the terminal and the connection entity.

Moreover, in the two embodiments described here, in the table T, only the type, strictly speaking, of the access network used by the terminal for registering with the core network is finally taken into account. In a variant, it is possible to envision taking into account other features of the access network, such as for example the operator of the access network used by the terminal (notably to determine whether it is the same operator as that of the core network or a trusted operator), or other information relating to the access network, such as for example if the network used by the terminal is its nominal network or a visited network, or if the network visited and used by the terminal is the network of the server drafting the recommendation or another network, etc.

Thus, by way of example, a decision may be made to draft a recommendation to establish a secure tunnel if the visited network used by the terminal is associated with a weak security level by the core network, and conversely a recommendation not to establish a secure tunnel if the visited network is associated with a strong security level by the core network.

These features or information may be deduced by the server from the registration request from the terminal or from the signaling associated with this request, for example on the basis of the P-Visited-Network-Id field described in the document RFC 3455 published by the IETF.

Furthermore, in another embodiment, for drafting the recommendation it is also possible to envision taking into account, in addition to the access network used by the terminal, other "discriminating" factors having an influence on the security level provided by the access network, such as for example the location of the terminal, its user, etc. For this purpose, it is possible to use certain parameters contained in fields of the registration request from the terminal or received with the registration request, notably in the signaling associated with this request, such as for example the IP address of the terminal, the transport IP address of the registration request, the identifier of the terminal user or else the enciphering algorithms requested in the registration request by the terminal (in the Security Client field), and to fill the table T in such a way that it expresses various recommendations regarding the establishment of the secure tunnel according to these parameters also.

Thus, for example, for a Public WiFi access network, it is possible to envision having a "Not required" recommendation for a first range of IP transport addresses of the request and a "Required" recommendation for a second range of IP addresses.

In a similar way, for an access network of 3GPP type, it is possible to envision having a "Not required" recommendation for all the users of the terminals seeking to register with the core network, with the exception of certain users for which a "Required" recommendation will be drafted. These users can be identified by the server according to the invention, for example by consulting their user profile stored in the HSS (Home Subscriber Server) server of the core network, into which an appropriate instruction will have been entered. In parallel, an instruction can be incorporated into the table T specifying the existence of such users, for which the recommendation established according to the type of access network must be weighted according to the identifier of the terminal user.

It will be noted that in the description above, the access network used by the terminal is favored as main criterion for drafting the recommendation to establish or not establish the secure tunnel, and optionally considering other supplementary parameters such as the identity of the terminal user seeking to register. It is, however, possible to reverse this order of priority or even to consider only one of these parameters as the sole criterion for drafting the recommendation to establish or not establish the secure tunnel.

APPENDIX 1

Ex. 1: registration request REG1 from the terminal 2, received by the P-CSCF server 3

REGISTER sip:home.com SIP/2.0
Via: SIP/2.0/UDP ....
P-Access-Network-Info: 3gpp-utran-TDD;utran-cell-id-3gpp=.....
From: <sip:bob@home.com>;tag=1234
To: <sip:bob@home.com>
Contact: <sip:AoC_bob>;expires=3600
Call-ID: 5678
Authorization: Digest username="bob_private@home.com",
realm="home.com", nonce="", uri="sip:home.com", response=""
Security-Client: ipsec-3gpp; alg=hmac-sha1-96; ealg=des-ede3-cbc;
spi-c=2482; spi-s=2483; port-c=32045; port-s=40375
Require: sec-agree
Proxy-Require: sec-agree
Cseq: 1 REGISTER
Content-Length: 0

Ex. 2: registration request REG2 from the terminal 2, transmitted by the P-CSCF server 3 and received by the S-CSCF server 4

REGISTER sip:home.com SIP/2.0
Via: SIP/2.0/UDP P-CSCF....
Via: SIP/2.0/UDP ....
P-Access-Network-Info: 3gpp-utran-TDD;utran-cell-id-3gpp=.....
From: <sip:bob@home.com>;tag=1234
To: <sip:bob@home.com>
Contact: <sip:AoC_bob>;expires=3600
Call-ID: 5678
Authorization: Digest username="bob_private@home.com",
realm="home.com", nonce="", uri="sip:home.com", response=""
Require: sec-agree
Proxy-Require: sec-agree
Cseq: 1 REGISTER
...
Content-Length: 0

APPENDIX 1-continued

Ex. 3: message M1 transmitted by the S-CSCF server 4 containing a recommendation SIP/2.0 401 Unauthorized
Via: SIP/2.0/UDP P-CSCF....
Via: SIP/2.0/UDP ....
From: <sip:bob@home.com>;tag=1234
To: <sip:bob@home.com>;tag=rem_9876
Call-ID: 5678
WWW-Authenticate: Digest realm="home.com", nonce="
V4pj+BE4T3J/CmetIDNW9p6hNnAQR0IDQeVyt5NQvhE=",
algorithm=AKAv1-MD5
Security-Server: tunnel=not_required
Cseq: 1 REGISTER
Content-Length: 0

Ex. 4: message M2 transmitted to the terminal 2 by the P-CSCF server 3 containing the recommendation of the S-CSCF server 4

SIP/2.0 401 Unauthorized
Via: SIP/2.0/UDP ....
From: <sip:bob@home.com>;tag=1234
To: <sip:bob@home.com>;tag=rem_9876
Call-ID: 5678
WWW-Authenticate: Digest realm="home.com", nonce="
V4pj+BE4T3J/CmetIDNW9p6hNnAQR0IDQeVyt5NQvhE=",
algorithm=AKAv1-MD5
Security-Server: ipsec-3gpp; q=0.5; alg=hmac-sha1-96;
ealg=des-ede3-cbc;
spi-c=5142; spi-s=5143; port-c=6045; port-s=6044;tunnel=not_required
Cseq: 1 REGISTER
Content-Length: 0

APPENDIX 2

Ex. 1: registration request REG1' from the terminal 2', received by the P-CSCF server 3'

REGISTER sip:home.com SIP/2.0
Via: SIP/2.0/UDP ....
P-Access-Network-Info: 3gpp-utran-TDD;utran-cell-id-3gpp=.....
From: <sip:bob@home.com>;tag=1234
To: <sip:bob@home.com>
Contact: <sip:AoC_bob>;expires=3600
Call-ID: 5678
Authorization: Digest username="bob_private@home.com",
realm="home.com", nonce="", uri="sip:home.com", response=""
Security-Client: ipsec-3gpp; alg=hmac-sha1-96; ealg=des-ede3-cbc;
spi-c=2482; spi-s=2483; port-c=32045; port-s=40375
Require: sec-agree
Proxy-Require: sec-agree
Cseq: 1 REGISTER
Content-Length: 0

Ex. 2: message M2' sent by the P-CSCF server 3' to the terminal 2' containing a recommendation SIP/2.0 401 Unauthorized
Via: SIP/2.0/UDP ....
From: <sip:bob@home.com>;tag=1234
To: <sip:bob@home.com>;tag=rem_9876
Call-ID: 5678
WWW-Authenticate: Digest realm="home.com", nonce="
V4pj+BE4T3J/CmetIDNW9p6hNnAQR0IDQeVyt5NQvhE=",
algorithm=AKAv1-MD5
Security-Server: ipsec-3gpp; q=0.5; alg=hmac-sha1-96;
ealg=des-ede3-cbc;
spi-c=5142; spi-s=5143; port-c=6045; port-s=6044;tunnel=not_required
Cseq: 1 REGISTER
Content-Length: 0

The invention claimed is:

1. A method for the transmission of a message by a server of a multimedia IP core network, said method comprising:
receiving a request from a terminal to register with the multimedia IP core network, the registration request proposing an authentication method associated with the establishment of a secure tunnel between the terminal and a connection entity for connecting said terminal to the multimedia IP core network;
identifying an access network used by the terminal for registering with the multimedia IP core network;
drafting, taking into account a level of data security associated by the multimedia IP core network with the identified access network, a recommendation regarding the establishment of the secure tunnel between the terminal and the connection entity for said authentication method, wherein said recommendation is configured to cause a decision to be made by said terminal, on the basis of said recommendation, to choose to establish or not to establish the secure tunnel between the terminal and the connection entity; and
inserting said recommendation into the message transmitted by the server.

2. The method as claimed in claim 1, wherein:
the multimedia IP core network implements an IMS architecture;
the server of the multimedia IP core network is an S-CSCF server; and
the message into which the recommendation is inserted is transmitted by the S-CSCF server to the terminal via a P-CSCF server connecting the terminal to the multimedia IP core network.

3. The method as claimed in claim 1, wherein:
the multimedia IP core network implements an IMS architecture;
the server of the multimedia IP core network is a P-CSCF server; and
the message into which the recommendation is inserted is transmitted to the terminal.

4. The method as claimed in claim 1, wherein the transmitted message complies with the SIP protocol, and the recommendation is inserted into a "Security Server" field of said message.

5. The method as claimed in claim 1, wherein the recommendation is also drafted according to at least one parameter received with the registration request.

6. The method as claimed in claim 5, wherein said at least one parameter comprises a transport IP address of the registration request or an identifier associated with a user of the terminal.

7. The method as claimed in claim 1, wherein the message transmitted by the server furthermore contains information allowing the establishment of the secure tunnel between the terminal and the entity for connecting said terminal to the multimedia IP core network.

8. The method as claimed in claim 1, wherein the recommendation inserted into the message comprises one of the following instructions:
an instruction not to establish the secure tunnel between the terminal and the connection entity;
an instruction of free choice regarding the establishment of the secure tunnel between the terminal and the connection entity; and
an instruction to establish the secure tunnel between the terminal and the connection entity.

9. A method for registering a terminal with a multimedia IP core network, said method comprising:
transmitting, by the terminal, a request to register with the multimedia IP core network, via an access network, said registration request proposing an authentication method associated with the establishment of a secure tunnel between the terminal and a connection entity for connecting said terminal to the multimedia IP core network;

receiving, by the terminal, from the multimedia IP core network, a recommendation regarding the establishment or non-establishment of the secure tunnel between the terminal and the connection entity for said authentication method, said recommendation originating from a message transmitted by a server of the multimedia IP core network in accordance with a transmission method executed following the reception of the registration request from the terminal, wherein said recommendation is configured to cause a decision to be made by said terminal, on the basis of said recommendation, to choose to establish or not to establish the secure tunnel between the terminal and the connection entity; and interpreting of said recommendation by the terminal; wherein said transmission method comprises:

identifying an access network used by the terminal for registering with the multimedia IP core network;

drafting, taking into account a level of data security associated with the access network identified as being used by the terminal, said recommendation to establish or not to establish the secure tunnel between the terminal and the connection entity for said authentication method; and inserting said recommendation into the message transmitted by the server.

10. A transmission method for implementation by a connection entity for connecting a terminal to a multimedia IP core network, said transmission method comprising:

receiving a request from the terminal to register with the multimedia IP core network, via an access network, said registration request proposing an authentication method associated with the establishment of a secure tunnel between said terminal and said connection entity;

transmitting said registration request to a server of the multimedia IP core network;

receiving, from the server, a message containing a recommendation regarding the establishment or non-establishment of the secure tunnel between the terminal and the connection entity for said authentication method, the message resulting from the execution by the server of a method for transmitting a message, wherein said recommendation is configured to cause a decision to be made by said terminal, on the basis of said recommendation, to choose to establish or not to establish the secure tunnel between the terminal and the connection entity; and transmitting said recommendation to the terminal; wherein said method for transmitting a message executed by said server comprises:

identifying an access network used by the terminal for registering with the multimedia IP core network;

drafting, taking into account a level of data security associated with the access network identified as being used by the terminal, said recommendation to establish or not to establish the secure tunnel between the terminal and the connection entity for said authentication method; and inserting said recommendation into the message transmitted by the server.

11. A computer having stored thereon instructions which, when executed by said computer, cause said computer to perform a method for the transmission of a message by a server of a multimedia IP core network following the reception by said server of a request from a terminal to register with the multimedia IP core network, said registration request proposing an authentication method associated with the establishment of a secure tunnel between the terminal and a connection entity for connecting said terminal to the multimedia IP core network, wherein said method comprises:

identifying an access network used by the terminal for registering with the multimedia IP core network;

drafting, taking into account a level of data security associated with the access network identified as being used by the terminal, a recommendation to establish or not to establish the secure tunnel between the terminal and the connection entity for said authentication method, wherein said recommendation is configured to cause a decision to be made by said terminal, on the basis of said recommendation, to choose to establish or not to establish the secure tunnel between the terminal and the connection entity; and inserting said recommendation into the message transmitted by the server.

12. A non-transitory computer-readable medium having stored thereon instructions which, when executed by a computer, cause said computer to perform a method for the transmission of a message by a server of a multimedia IP core network following the reception by said server of a request from a terminal to register with the multimedia IP core network, said registration request proposing an authentication method associated with the establishment of a secure tunnel between the terminal and a connection entity for connecting said terminal to the multimedia IP core network, wherein said method comprises:

identifying an access network used by the terminal for registering with the multimedia IP core network;

drafting, taking into account a level of data security associated with the access network identified as being used by the terminal, a recommendation to establish or not to establish the secure tunnel between the terminal and the connection entity for said authentication method, wherein said recommendation is configured to cause a decision to be made by said terminal, on the basis of said recommendation, to choose to establish or not to establish the secure tunnel between the terminal and the connection entity; and inserting said recommendation into the message transmitted by the server.

13. A server of a multimedia IP core network, said server comprising a processor executing software configured to be activated upon the reception, by the server, of a request from a terminal to register with the multimedia IP core network, said registration request proposing an authentication method associated with the establishment of a secure tunnel between the terminal and a connection entity for connecting said terminal to the multimedia IP core network, wherein said processor executing software configured to be activated upon said reception is:

configured to execute software which identifies an access network used by the terminal for registering with the multimedia IP core network;

configured to execute software which drafts, taking into account a level of data security associated with the access network identified as being used by the terminal, a recommendation to establish or not to establish the secure tunnel between the terminal and the connection entity for said authentication method, wherein said recommendation is configured to cause a decision to be made by said terminal, on the basis of said recommendation, to choose to establish or not to establish the secure tunnel between the terminal and the connection entity;

configured to execute software which inserts said recommendation into a message; and
configured to execute software which causes the message to be transmitted.

14. A terminal comprising:
a processor executing software configured to transmit a request to register with a multimedia IP core network via an access network, said registration request proposing an authentication method associated with the establishment of a secure tunnel between the terminal and a connection entity for connecting said terminal to the multimedia IP core network;
a processor executing software configured to receive, from the multimedia IP core network, a recommendation regarding the establishment or non-establishment of the secure tunnel between the terminal and the connection entity for said authentication method, said recommendation originating from a message transmitted by a server of the multimedia IP core network, following the reception of the registration request, wherein said recommendation is configured to cause a decision to be made by said terminal, on the basis of said recommendation, to choose to establish or not to establish the secure tunnel between the terminal and the connection entity; and
a processor executing software configured to interpret said recommendation;
wherein said server of the multimedia IP core network comprises a processor executing software configured to be activated upon the reception, by the server, of a request from a terminal to register with the multimedia IP core network, said registration request proposing an authentication method associated with the establishment of a secure tunnel between the terminal and a connection entity for connecting said terminal to the multimedia IP core network, wherein said processor executing software configured to be activated upon said reception is:
configured to execute software which identifies an access network used by the terminal for registering with the multimedia IP core network;
configured to execute software which drafts, taking into account a level of data security associated with the access network identified as being used by the terminal, said recommendation to establish or not to establish the secure tunnel between the terminal and the connection entity for said authentication method;
configured to execute software which inserts said recommendation into a message; and
configured to execute software which causes the message to be transmitted.

15. A connection entity for connecting a terminal to a multimedia IP core network, said connection entity comprising:
a processor executing software configured to receive a request to register with the multimedia IP core network, via an access network, said registration request proposing an authentication method associated with the establishment of a secure tunnel between said terminal and said connection entity;
a processor executing software configured to transmit said registration request to a server;
a processor executing software configured to receive, from the server, a message containing a recommendation regarding the establishment or non-establishment of the secure tunnel between the terminal and the connection entity for said authentication method, wherein said recommendation is configured to cause a decision to be made by said terminal, on the basis of said recommendation, to choose to establish or not to establish the secure tunnel between the terminal and the connection entity; and
a processor executing software configured to transmit said recommendation to said terminal;
wherein said server comprises a processor executing software configured to be activated upon the reception, by the server, of a request from a terminal to register with the multimedia IP core network, said registration request proposing an authentication method associated with the establishment of a secure tunnel between the terminal and a connection entity for connecting said terminal to the multimedia IP core network, wherein said processor executing software configured to be activated upon said reception is:
configured to execute software which identifies an access network used by the terminal for registering with the multimedia IP core network;
configured to execute software which drafts, taking into account a level of data security associated with the access network identified as being used by the terminal, said recommendation to establish or not to establish the secure tunnel between the terminal and the connection entity for said authentication method;
configured to execute software which inserts said recommendation into a message; and
configured to execute software which causes the message to be transmitted.

16. A communication system comprising:
a server of a multimedia IP core network;
a terminal capable of registering with the multimedia core network by sending a registration request to said core network via an access network, wherein said terminal comprises (a) a processor executing software configured to transmit a request to register with a multimedia IP core network via an access network, said registration request proposing an authentication method associated with the establishment of a secure tunnel between the terminal and a connection entity for connecting said terminal to the multimedia IP core network, (b) a processor executing software configured to receive, from the multimedia IP core network, a recommendation regarding the establishment or non-establishment of the secure tunnel between the terminal and the connection entity for said authentication method, said recommendation originating from a message transmitted by said server of the multimedia IP core network, following the reception of the registration request, wherein said recommendation is configured to cause a decision to be made by said terminal, on the basis of said recommendation, to choose to establish or not to establish the secure tunnel between the terminal and the connection entity and (c) a processor executing software configured to interpret said recommendation; and
a connection entity for connecting the terminal to the multimedia IP core network;
said terminal being capable of executing said recommendation drafted by the server regarding the establishment or non-establishment of a secure tunnel between the terminal and the entity for connecting the terminal to the multimedia IP core network;
wherein said server of a multimedia IP core network comprises a processor executing software configured to be activated upon the reception, by the server, of a request from a terminal to register with the multimedia IP core network, said registration request proposing an authentication method associated with the establishment of a secure tunnel between the terminal and a connection entity for connecting said terminal to the multimedia IP core network, wherein said processor executing software configured to be activated upon said reception is:
configured to execute software which identifies an access network used by the terminal for registering with the multimedia IP core network;
configured to execute software which drafts, taking into account a level of data security associated with the access network identified as being used by the terminal, said recommendation to establish or not to establish the secure tunnel between the terminal and the connection entity for said authentication method;
configured to execute software which inserts said recommendation into a message; and
configured to execute software which causes the message to be transmitted.

17. A computer having stored thereon instructions which, when executed by said computer, cause said computer to perform a method for registering a terminal with an IP core network, said method comprising:
transmitting, by the terminal, a request to register with the multimedia IP core network, via an access network, said registration request proposing an authentication method associated with the establishment of a secure tunnel between the terminal and a connection entity for connecting said terminal to the multimedia IP core network;
receiving, by the terminal, from the multimedia IP core network, a recommendation regarding the establishment or non-establishment of the secure tunnel between the terminal and the connection entity for said authentication method, said recommendation originating from a message transmitted by a server of the multimedia IP core network in accordance with a transmission method executed following the reception of the registration request from the terminal, wherein said recommendation is configured to cause a decision to be made by said terminal, on the basis of said recommendation, to choose to establish or not to establish the secure tunnel between the terminal and the connection entity; and
interpreting of said recommendation by the terminal;
wherein said transmission method comprises:
identifying an access network used by the terminal for registering with the multimedia IP core network;
drafting, taking into account a level of data security associated with the access network identified as being used by the terminal, said recommendation to establish or not to establish the secure tunnel between the terminal and the connection entity for said authentication method; and
inserting said recommendation into the message transmitted by the server.

18. A non-transitory computer-readable medium having stored thereon instructions which, when executed by a computer, cause said computer to perform a method for registering a terminal with an IP core network, said method comprising:
transmitting, by the terminal, a request to register with the multimedia IP core network, via an access network, said registration request proposing an authentication method associated with the establishment of a secure tunnel between the terminal and a connection entity for connecting said terminal to the multimedia IP core network;
receiving, by the terminal, from the multimedia IP core network, a recommendation regarding the establishment or non-establishment of the secure tunnel between the terminal and the connection entity for said authentication method, said recommendation originating from a message transmitted by a server of the multimedia IP core network in accordance with a transmission method executed following the reception of the registration request from the terminal, wherein said recommendation is configured to cause a decision to be made by said terminal, on the basis of said recommendation, to choose to establish or not to establish the secure tunnel between the terminal and the connection entity; and
interpreting of said recommendation by the terminal;
wherein said transmission method comprises:
identifying an access network used by the terminal for registering with the multimedia IP core network;
drafting, taking into account a level of data security associated with the access network identified as being used by the terminal, said recommendation to establish or not to establish the secure tunnel between the terminal and the connection entity for said authentication method; and
inserting said recommendation into the message transmitted by the server.

19. A computer having stored thereon instructions which, when executed by a computer, cause said computer to perform a transmission method for implementation by a connection entity for connecting a terminal to a multimedia IP core network, said transmission method comprising:
receiving a request from the terminal to register with the multimedia IP core network, via an access network, said registration request proposing an authentication method associated with the establishment of a secure tunnel between said terminal and said connection entity;
transmitting said registration request to a server of the multimedia IP core network;
receiving, from the server, a message containing a recommendation regarding the establishment or non-establishment of the secure tunnel between the terminal and the connection entity for said authentication method, the message resulting from the execution by the server of a method for transmitting a message, wherein said recommendation is configured to cause a decision to be made by said terminal, on the basis of said recommendation, to choose to establish or not to establish the secure tunnel between the terminal and the connection entity; and
transmitting said recommendation to the terminal;
wherein said method for transmitting a message executed by said server comprises:
identifying an access network used by the terminal for registering with the multimedia IP core network;
drafting, taking into account a level of data security associated with the access network identified as being used by the terminal, said recommendation to establish or not to establish the secure tunnel between the terminal and the connection entity for said authentication method; and
inserting said recommendation into the message transmitted by the server.

20. A non-transitory computer-readable medium having stored thereon instructions which, when executed by a computer, cause said computer to perform a transmission method for implementation by a connection entity for connecting a terminal to a multimedia IP core network, said transmission method comprising:

receiving a request from the terminal to register with the multimedia IP core network, via an access network, said registration request proposing an authentication method associated with the establishment of a secure tunnel between said terminal and said connection entity;

transmitting said registration request to a server of the multimedia IP core network;

receiving, from the server, a message containing a recommendation regarding the establishment or non-establishment of the secure tunnel between the terminal and the connection entity for said authentication method, the message resulting from the execution by the server of a method for transmitting a message, wherein said recommendation is configured to cause a decision to be made by said terminal, on the basis of said recommendation, to choose to establish or not to establish the secure tunnel between the terminal and the connection entity; and transmitting said recommendation to the terminal;

wherein said method for transmitting a message executed by said server comprises:

identifying an access network used by the terminal for registering with the multimedia IP core network;

drafting, taking into account a level of data security associated with the access network identified as being used by the terminal, said recommendation to establish or not to establish the secure tunnel between the terminal and the connection entity for said authentication method; and inserting said recommendation into the message transmitted by the server.

21. The method of claim 1, wherein the recommendation comprises one of the following instructions:

an instruction not to establish the secure tunnel between the terminal and the connection entity;

an instruction of free choice regarding the establishment of the secure tunnel between the terminal and the connection entity; and an instruction to establish the secure tunnel between the terminal and the connection entity.

22. The method of claim 1, further comprising decision by the terminal whether or not to execute said recommendation.

23. The method of claim 1, wherein the terminal comprises a mobile terminal.

24. The method of claim 1, wherein the access network comprises a radio access network.

* * * * *